(12) United States Patent
Bowman et al.

(10) Patent No.: US 7,183,503 B2
(45) Date of Patent: Feb. 27, 2007

(54) RECESSED IN-FLOOR FITTING

(75) Inventors: Timothy S. Bowman, Canton, CT (US); Michael T. Cole, Weatogue, CT (US)

(73) Assignee: Wiremold Company, West Hartford, CT (US)

( * ) Notice: Subject to any disclaimer, the term of this patent is extended or adjusted under 35 U.S.C. 154(b) by 0 days.

(21) Appl. No.: 11/014,479

(22) Filed: Dec. 16, 2004

(65) Prior Publication Data

US 2005/0133235 A1 Jun. 23, 2005

Related U.S. Application Data

(60) Provisional application No. 60/532,187, filed on Dec. 23, 2003.

(51) Int. Cl.
*H02G 3/04* (2006.01)
(52) U.S. Cl. .................. 174/483; 174/485; 174/486; 439/538; 52/220.8
(58) Field of Classification Search .............. 174/48, 174/57, 67, 49, 485–490, 483; 439/135, 439/538, 650, 536; 52/220.8, 220.5, 220.7; 220/3.5–3.8, 3.3
See application file for complete search history.

(56) References Cited

U.S. PATENT DOCUMENTS

| | | | |
|---|---|---|---|
| 1,518,733 A | 12/1924 | Eckstein | |
| 1,717,836 A | 6/1929 | Conner | |
| 3,975,075 A | 8/1976 | Mason | |
| 4,091,231 A | 5/1978 | Sotolongo | |
| 4,266,266 A | 5/1981 | Sanner | |
| 4,323,724 A | 4/1982 | Shine | |
| 4,336,416 A | 6/1982 | Goodsell | |
| 4,583,799 A | 4/1986 | Wiley | |
| 4,770,643 A | 9/1988 | Castellani et al. | |
| 4,827,080 A | 5/1989 | Castellani et al. | |
| 4,864,078 A | 9/1989 | Bowman | |
| 4,978,318 A | 12/1990 | Wiley et al. | |
| 4,993,970 A | 2/1991 | Littrell | |
| 5,030,795 A | 7/1991 | Domigan | |
| 5,124,876 A | 6/1992 | Misencik et al. | |
| 5,135,411 A | 8/1992 | Wiley et al. | |
| 5,195,288 A | 3/1993 | Penczak | |
| 5,272,278 A | 12/1993 | Wuertz | |
| 5,285,009 A | 2/1994 | Bowman et al. | |
| 5,362,922 A | 11/1994 | Whitehead | |

(Continued)

OTHER PUBLICATIONS

Hubbell Brochure entitled "Fire-Rated Poke-Through Flush Series"; dated 1989.
Raceway Components Brochure entitled "Flush Poke-Thru"; dated Sep. 1991.
Hubbell Brochure entitled "Fire-Rated Poke-Through Flush Furniture Feed"; dated 1992.
Raceway Components Brochure entitled "Four On The Floor and More . . . The Flush Poke-Thru Doubles It's Capacity"; dated 1994.

(Continued)

*Primary Examiner*—Dhiru R. Patel
(74) *Attorney, Agent, or Firm*—McAndrews, Held & Malloy, Ltd.

(57) ABSTRACT

Embodiments of the present invention include an in-floor fitting for providing access to an underfloor electric distribution system. The in-floor fitting includes a cover configured to move between open and closed positions and being moved to an open position to allow a cable to pass therethrough. The in-floor fitting includes a receptacle positioned below the cover and configured to operatively connect to a cable comprising at least one of an electrical cable and a communication cable, wherein the cover is substantially flush with a surface of a floor when the cable is operatively connected to the receptacle and the cover is in the closed position.

20 Claims, 5 Drawing Sheets

U.S. PATENT DOCUMENTS

| | | | |
|---|---|---|---|
| 5,460,542 | A | 10/1995 | Castellani et al. |
| 5,467,565 | A | 11/1995 | Bowman et al. |
| 5,705,772 | A | 1/1998 | Brown |
| 5,763,826 | A | 6/1998 | Castellani et al. |
| 5,814,764 | A | 9/1998 | Kohaut |
| 6,018,126 | A | 1/2000 | Castellani et al. |
| 6,114,623 | A | 9/2000 | Bonilla et al. |
| 6,175,078 | B1 | 1/2001 | Bambardekar et al. |
| 6,307,152 | B1 | 10/2001 | Bonilla et al. |
| 6,353,180 | B1 | 3/2002 | DeBartolo, Jr. et al. |
| 6,417,446 | B1 * | 7/2002 | Whitehead .............. 174/48 |
| 6,462,277 | B1 | 10/2002 | Young et al. |
| 6,483,028 | B2 | 11/2002 | DeBartolo, Jr. et al. |
| 6,545,215 | B2 | 4/2003 | Young et al. |
| 6,612,081 | B2 | 9/2003 | Cole et al. |
| 6,750,395 | B2 | 6/2004 | Stout et al. |
| 6,854,226 | B2 | 2/2005 | Cole et al. |
| 2002/0116883 | A1 | 8/2002 | Cole et al. |
| 2004/0099429 | A1 | 5/2004 | Castellani et al. |
| 2005/0133234 | A1 | 6/2005 | Cole |

OTHER PUBLICATIONS

Walker Brochure for RC700 Series Flush Poke-Thru entitled "Place Power and Communication Services Where Needed"; dated 1997.

Walker Brochure entitled "Walker RCI RC900 Series Quad Poke-Thru"; dated 1997.

Walker Brochure for RC2001 Category 5 Flush Poke-Thru entitled "RC2001 Multiple Service Category 5 Flush Poke-Thru"; dated 1997.

Hubbell Brochure entitled "Fire-Rated Poke-Throughs"; dated 1998.

Walker Brochure entitled "RC3 Series Multiple Service Category 5 and Fiber Optic Flush Poke-Thru"; dated 1998.

Walker Brochure entitled "Flush Floor Box Series Covers For Use With Walker 880 Series Round Floor Boxes"; dated 1998.

Wiremold Brochure entitled "Walker RCI Poke-Thrus"; dated 1999.

* cited by examiner

RECESSED IN-FLOOR FITTING

RELATED APPLICATIONS

This application is related to, and claims priority from, Provisional Application No. 60/532,187, filed Dec. 23, 2003, titled "Recessed In-Floor Fitting," the complete subject matter of which is incorporated herein by reference in its entirety.

BACKGROUND OF THE INVENTION

The present invention generally relates to an in-floor fitting for carrying electrical equipment in the floors of buildings. More particularly, the present invention relates to a recessed in-floor fitting that remains flush with the floor even when receiving a cable plug.

In-floor fittings such as poke-thru fittings, afterset fittings, and preset fittings are installed in concrete floors to provide electrical receptacles and communication/data receptacles (or jacks) at desired locations in buildings. Poke-thru fittings are designed to be installed in an opening in a floor, such as a concrete slab or steel deck, in a building structure such as an office building to provide electrical receptacles and/or communication/data receptacles at desired locations in buildings. As explained in U.S. Pat. No. 4,770,643, source power and signal cables, loosely positioned in a plenum, which is between the ceiling of the floor below and the floor above (that is, the floor in which the opening is in), may be pulled from the plenum and connected with or passed through the poke-thru fitting for activation of services for and on the floor above. More specifically, high voltage source power cables are connected with power receptacles that may be mounted within the poke-thru fitting or surface mounted on the floor above the fitting. Lower voltage communication/data signal cables have traditionally been passed through the poke-thru fitting to provide above floor connections between these cables and equipment positioned on the floor above. More recently, poke-thru fittings have been developed that also provide for mounting the communication/data receptacle within the fitting.

Standards promulgated by Underwriters Laboratories (UL) require poke-thru fittings to enable the fire rating of the floor to be substantially the same with or without the floor opening and fitting therein. As a result, poke-thru fittings typically incorporate fire-retarding material, generally intumescent material, to retard the transmission of heat and flame from a fire in the plenum, for example. The intumescent material is activated upon exposure to a fire's heat and flames, rising through the floor opening from a fire below the floor. The intumescent material absorbs the heat and expands to fill open spaces in the floor.

Components of many in-floor fittings upwardly protrude above the surface of the floor when electrical and communications devices within the fittings are operatively connected to an above-floor system (e.g., a personal computer). For example, access doors and egress doors of the access doors may be open and/or ajar due to the fact that cabling and/or wiring is passing through an in-floor fitting. Such protrusions may be aesthetically unpleasant and may also pose tripping hazards.

Thus, a need exists for a poke-thru assembly that addresses the problems described above.

BRIEF SUMMARY OF THE INVENTION

Certain embodiments of the present invention include an in-floor fitting for providing access to an underfloor electric distribution system. The in-floor fitting includes a cover configured to move between open and closed positions and being moved to an open position to allow a cable to pass therethrough. The in-floor fitting includes a receptacle positioned below the cover and configured to operatively connect to a cable comprising at least one of an electrical cable and a communication cable, wherein the cover is substantially flush with a surface of a floor when the cable is operatively connected to the receptacle and the cover is in the closed position.

Certain embodiments of the present invention include an in-floor fitting. The in-floor fitting includes an intumescent insert having at least one interior opening and a top plate having a top surface. The top plate is mounted over the intumescent insert and the top plate comprises at least one interior passage and support legs extending upwardly from the top surface. The in-floor fitting further includes a trim ring having an upper surface and being mounted to distal ends of the support legs. The in-floor fitting further includes at least one access door movably secured to the trim ring and that is movable to an open position and a closed position. The at least one access door is configured to be substantially flush with the upper surface of the trim ring when the access door is in a closed position. The at least one access door comprises an egress door configured to open and close relative to the at least one access door. The in-floor fitting further includes at least one of an electrical receptacle and a communication device, wherein a top surface of the at least one of an electrical receptacle and a communication device is substantially flush with the top surface of the top plate and at least a portion of the at least one of an electrical receptacle and a communication device is housed within the at least one interior opening of the intumescent insert.

Certain embodiments of the present invention include an in-floor fitting. The in-floor fitting includes an intumescent insert, a top plate being mounted to the intumescent insert and comprising support legs extending upwardly therefrom, and a trim ring having an upper surface and being mounted to distal ends of the support legs. The in-floor fitting further includes at least one access door secured to the trim ring and movable to an open and a closed position. The at least one access door is configured to be substantially flush with the upper surface of the trim ring when the access door is in the closed position. The at least one access door defines an opening. The in-floor fitting further includes at least one receptacle, wherein at least a portion of the at least one receptacle is housed within the top plate and the intumescent insert.

DETAILED DESCRIPTION OF THE INVENTION

Figure 1:
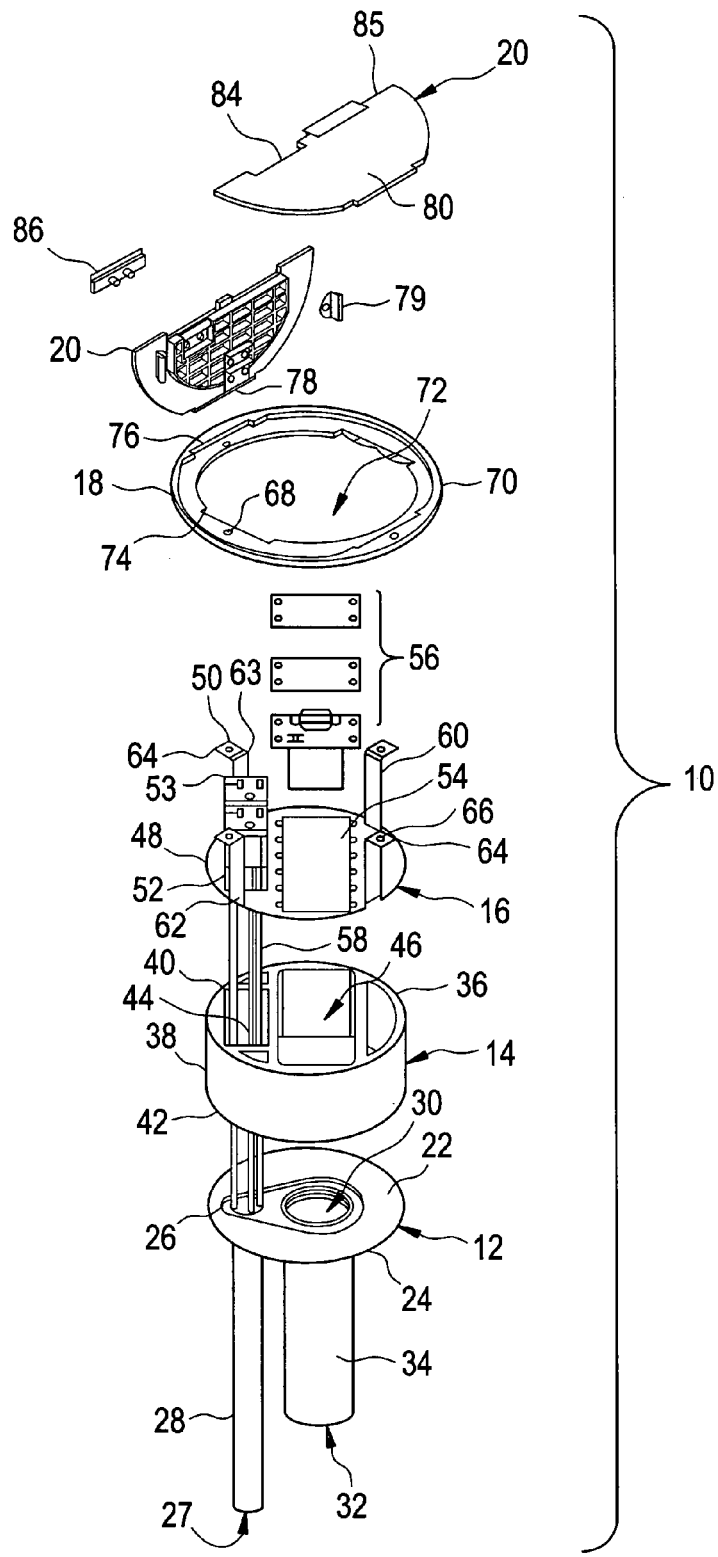
FIG. 1 illustrates an isometric exploded view of a poke-thru assembly according to an embodiment of the present invention.

FIG. 1 illustrates an isometric exploded view of a poke-thru assembly 10 according to an embodiment of the present invention. The assembly 10 includes a bottom plate 12, an intumescent insert 14, a top plate 16, a trim ring 18, and access doors 20.

The bottom plate 12 includes an upper surface 22 and a lower surface 24. An electrical opening 26 is formed from the upper surface 22 through the lower surface 24 and into a channel 27 defined by a cylindrical electrical conduit 28. A communication opening 30 is formed from the upper surface 22 through the lower surface 24 and into a channel 32 defined by a cylindrical communication conduit 34.

The intumescent insert 14 includes a generally cylindrical main body 36 defined by an outer wall 38 and upper and lower surfaces 40 and 42. An electrical opening 44 and a communication opening 46 extend from the upper surface 40 to the lower surface 42.

The top plate 16 includes a generally circular main body 48 with upwardly extending support legs 50. The main body 48 includes an electrical receptacle mounting structure 52 that is configured to receive and retain an electrical receptacle 53 (such as a duplex receptacle). Similarly, a communication mounting structure 54 is formed through the main body 48 and is configured to receive and retain a communications device 56 (such as a telephone, data, audio/visual connector, jack or device). The electrical receptacle mounting structure 52 and the communication mounting structure 54 are configured to securely retain the electrical receptacle 53 and the communication device 56, while at the same time, allowing cabling or wiring connected to each of the electrical receptacle 53 (such as wiring 58) and the communication device 56 to pass therethrough.

The intumescent insert 14 is configured to be sandwiched between the bottom plate 12 and the top plate 16. When the assembly 10 is fully assembled, electrical wiring (such as wiring 58) connected to the electrical receptacle 53 passes through an electrical passage defined by the mounting structure 52, the electrical opening 44, the electrical opening 26 and the channel 27. Similarly, communication/data cables pass through a communication passage defined by the mounting structure 54, the communication opening 46, the communication opening 30, and the channel 32.

Each upwardly extending leg 50 includes an upright portion 60 having a first end 62 secured to the main body 48 of the top plate 16 and a second end 63 having a mounting tab 64. The mounting tab 64 includes a fastener through-hole 66. The mounting tabs 64 are configured to securely support the trim ring 18. The trim ring 18 includes fastener through-holes 68 that are configured to align with the fastener through-holes 66 of the mounting tabs 64. The trim ring 18 may be secured to the mounting tabs 64 through screws, nails, rivets, and the like. Alternatively, the trim ring 18 may include latching members, clasps, barbs, or the like that are configured to securably engage reciprocal structures formed on the mounting tabs 64.

The trim ring 18 includes an annular body 70 defining a central passage 72. The fastener through-holes 68 are positioned proximate an internal edge 74 of the annular body 70, but may be formed at different areas of the annular body 70. The trim ring 18 is configured to be securely mounted slightly above, or flush with, a top surface of a floor (not shown). The trim ring 18 also includes hinge-mounting structures 76 configured to retain hinges 78 formed on the access doors 20. The hinges 78 are pivotally secured within the hinge-mounting structures 76. Thus, the access doors 20 may be pivoted between open and closed positions by way of the hinges 78 pivoting about the hinge-mounting structures 76 relative to the trim ring 18. Each access door 20 may be held in a closed position against the trim ring 18 with at least one spring clip 79 mounted thereto. The access doors 20 define a cover for the poke-thru assembly 10 when in the closed position.

Each access door 20 includes a semi-circular main body 80 having egress door openings 84 formed at an interior edge 85. An egress door 86 is configured to be movably secured within at least one egress door opening 84 on each access door 20. That is, the egress doors 86 may slide, pivot, or otherwise move relative to the egress door openings 84.

Figure 2:
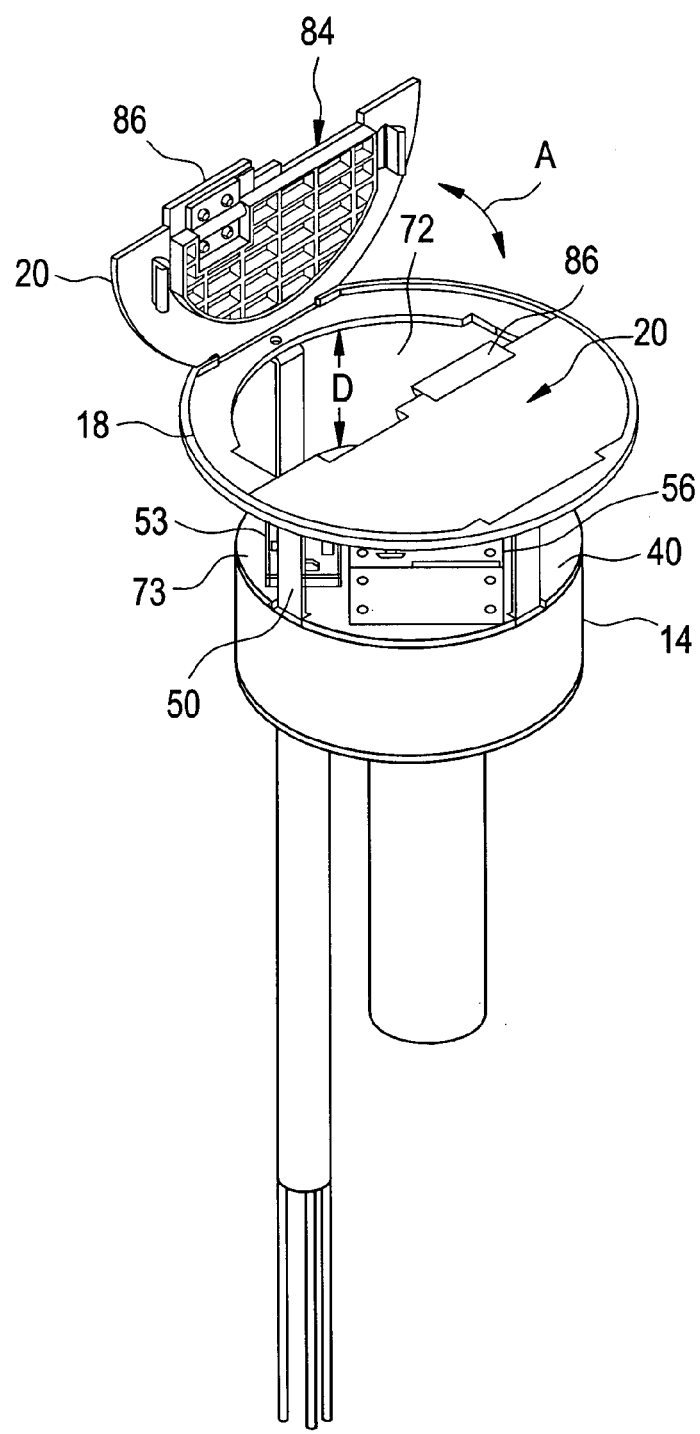
FIG. 2 illustrates an isometric view of the poke-thru assembly of FIG. 1 with one access door in an open position.

FIG. 2 illustrates an isometric view of a poke-thru assembly 10 with one access door 20 in an open position. As shown in FIG. 2, each access door 20 includes two egress door openings 84 but pivotally retains one egress door 86. An egress door 86 secured to one of the access doors 20 covers an opening defined by the egress door opening 84 of the access door 20 to which the egress door 86 is secured, and an egress door opening 84 of the access door 20 to which the egress door 86 is not secured. That is, each access door 20 includes an egress door opening 84 for the egress door 86 to which the access door 20 is connected to, and an egress door opening 84 that is a reciprocal opening for the egress door 86 of the other access door 20.

As shown in FIG. 2, the access doors 20 may be spring biased such that pressing down on the access doors 20 may deactivate a spring activated latch mechanism, thereby allowing the access door 20 to be pivoted into an open position in the direction of arrow A. The egress doors 86 may be pivoted into an open position by pushing downwardly thereon so that the egress door 86 is positioned below the surface of the access door 20. That is, instead of opening upwardly above the surface of the access door 20, the egress doors 86 are pushed downwardly below the access doors 20. In order to close the egress doors 86, the access doors 20 are opened and the egress doors 86 are swung back into a closed position. The access doors 20 have latching members that snapably, latchably, or otherwise removably secure the egress doors 86 into a closed position, but that also allow quick and easy opening of the egress doors 86.

Once the access doors 20 are open, electrical and communication cables (not shown) may be guided into the cavity formed between the upper surface of the intumescent insert and the central passage 72. The cables may be electrically connected to the electrical receptacle 53 (i.e., a plug mating with an electrical outlet of the electrical receptacle) and the communication device 56. As shown in FIG. 2, the top surface of the electrical receptacle 53 and the communication device 56 are substantially flush with an upper surface 73 of the intumescent insert 14. That is, the bulk of the electrical receptacle 53 and the communication device 56 are housed within electrical opening 44 and the communication opening 46 (FIG. 1), respectively, of the intumescent insert 14.

The legs 50 support the trim ring 18 and access doors 20 a distance D above the upper surface 73 (and hence the electrical receptacle 53 and the communication device 56). The distance D is adequate to allow an entire plug portion of an electrical cable, or large audio/video type connectors, to be housed within the central passage 72, below the surface of the trim ring 18 and the surface of the floor.

Figure 3:
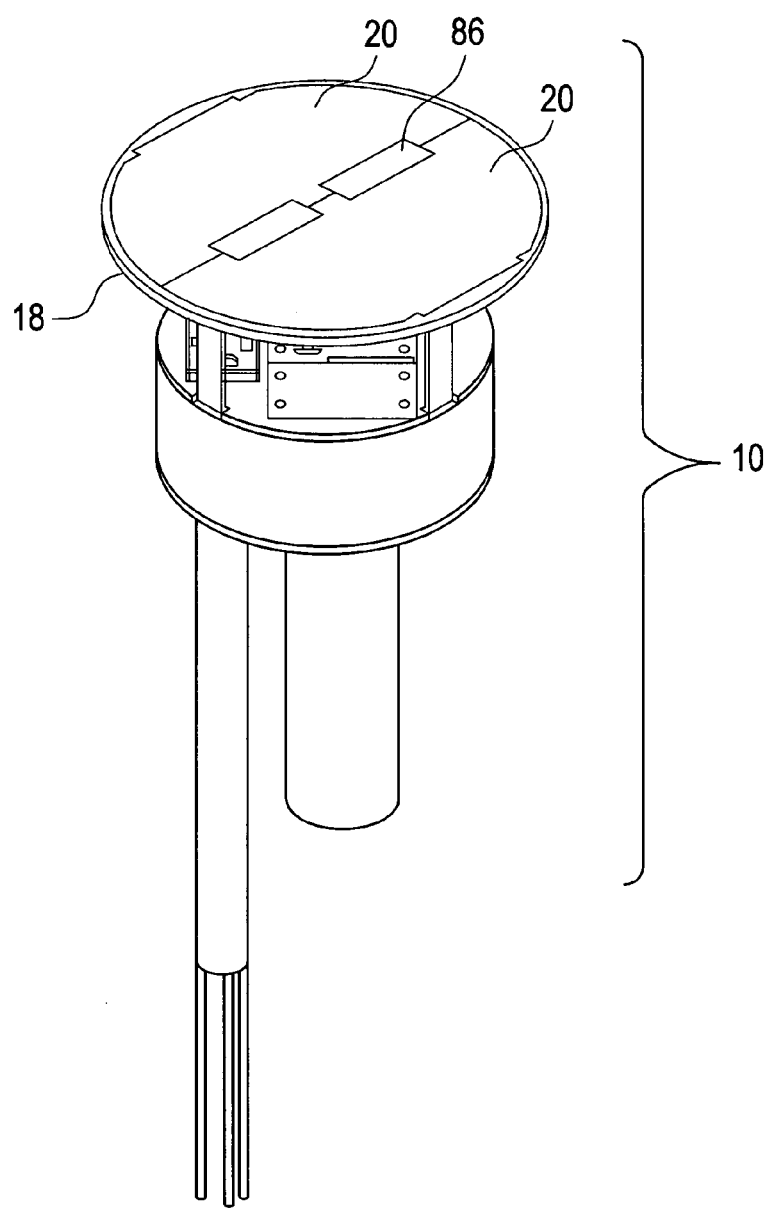
FIG. 3 illustrates an isometric view of the poke-thru assembly of FIG. 1 with the access doors in a closed position.

FIG. 3 illustrates an isometric view of a poke-thru assembly 10 with the access doors 20 in a closed position. As shown in FIG. 3, the access doors 20 and the egress doors 86 are substantially flush with an upper surface of the trim ring 18.

Figure 4:
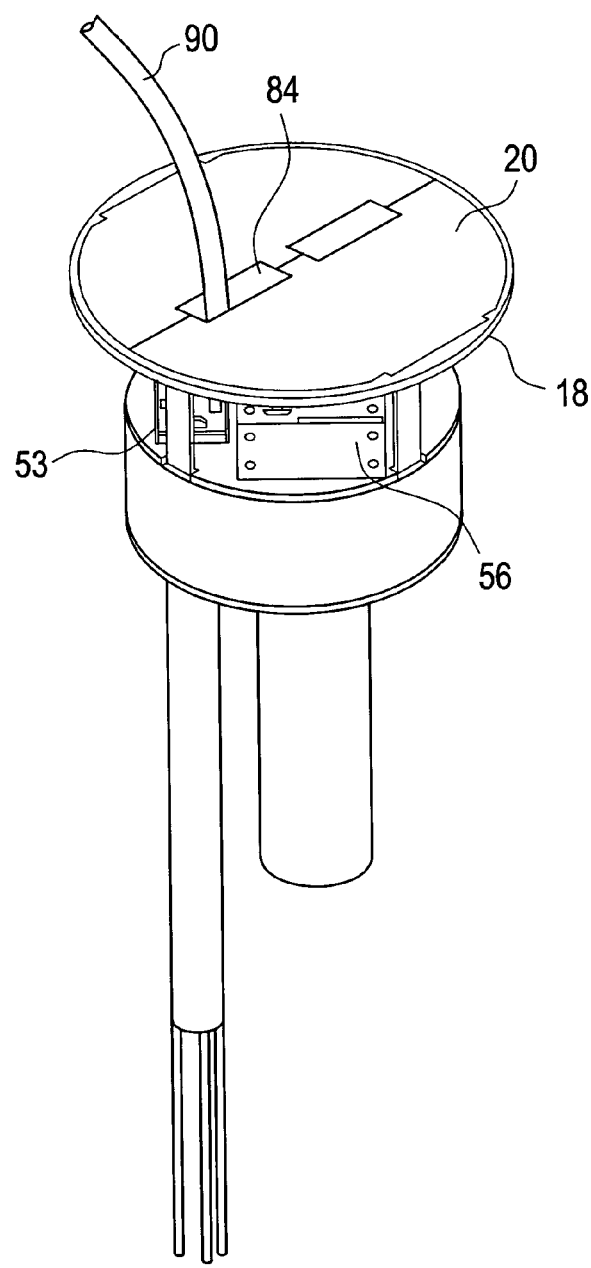
FIG. 4 illustrates an isometric view of the poke-thru assembly of FIG. 1 with the access doors closed and a cable passing through an egress door opening.
Figure 5:
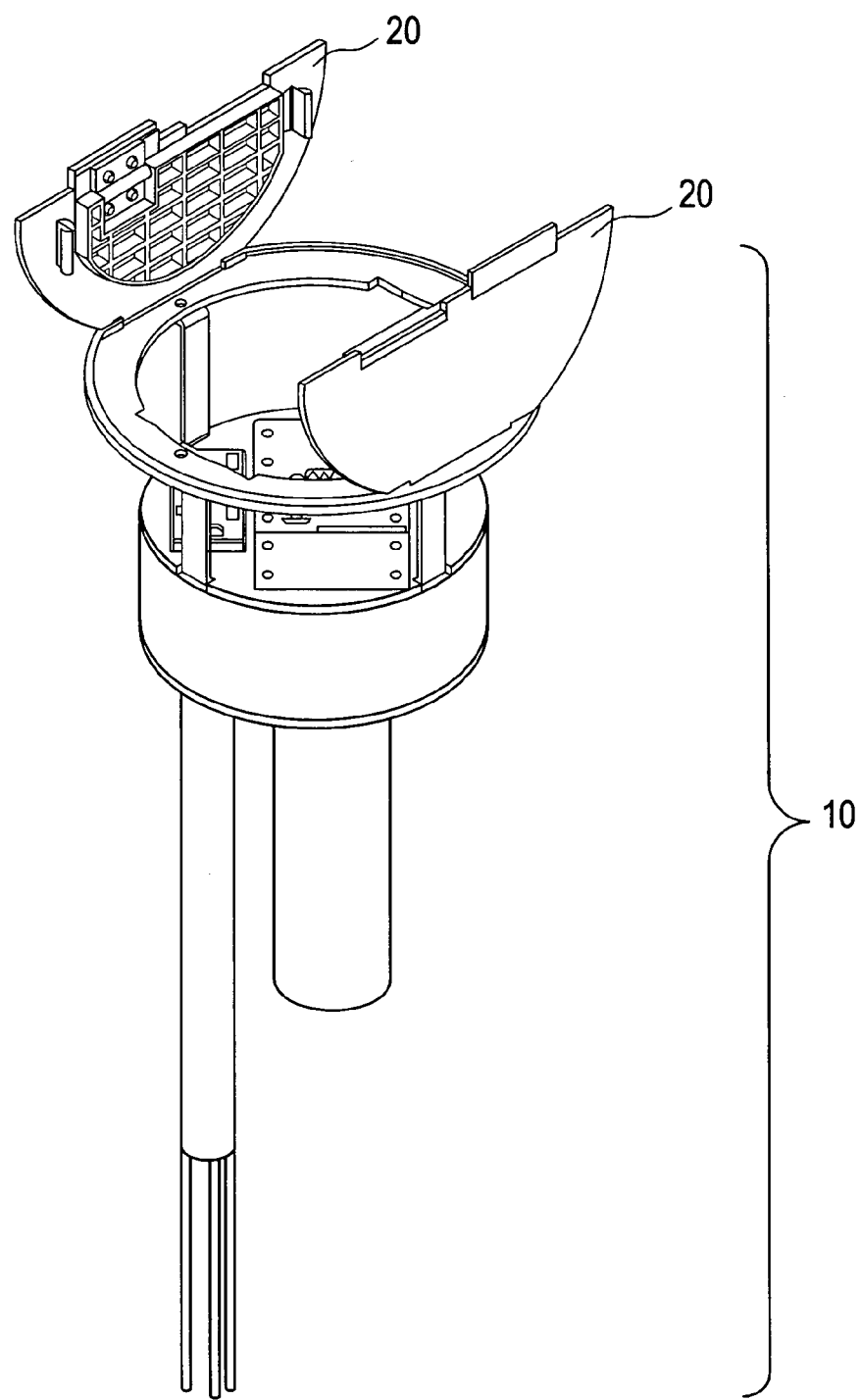
FIG. 5 illustrates an isometric view of the poke-thru assembly of FIG. 1 with both access doors in an open position.

FIG. 4 illustrates an isometric view of a poke-thru assembly 10 with the access doors 20 closed and a cable 90 passing through an egress door opening 84. The cable 90 is positioned within the central passage 72 when at least one of the access doors 20 is in an open position (as shown in FIG. 2). FIG. 5 illustrates an isometric view of a poke-thru assembly 10 with both access doors 20 in an open position.

Referring again to FIG. 4, after the cable is positioned within the central passage 72, an egress door 86 proximate the cable 90 is then depressed into an open position. Once the cable 90 is mated to an appropriate structure (e.g., the electrical receptacle 53 of the communication device 56), the access doors 20 are closed around the cable such that the cable 90 is positioned within an egress door opening 84. The egress door opening 84 (defined by the aligned egress door openings 84 of the two access doors 20) is sized to allow the cable to pass therethrough, while at the same time ensuring that the closed access doors 20 are flush with the top surface of the trim ring 18. Hence, the poke-thru assembly 10 does not include any components that protrude above a top surface of the trim ring 18, or substantially above the top surface of the floor. Likewise, another cable can be positioned in the poke-thru assembly 10 with the plug received in the central passage 72 and mated to the communications device 56 and the cable extending through an egress door opening 84 such that the access doors 20 are flush with the top surface of the trim ring 18. Both cables may be positioned within the poke-thru assembly 10 at the same time.

Alternatively, one of the receptacles of the recessed in-floor fitting may be a receptacle, jack, device, or power receptacle for being connected to an audio/visual connector or plug.

Alternatively, embodiments of the present invention may be used with a split dome configuration, as shown and described in U.S. Pat. No. 6,545,215, entitled "Split Dome Cover Assembly for an In-Floor Fitting," which is hereby expressly incorporated by reference in its entirety. Thus, the egress doors may slide into open and close positions. Also, alternatively, embodiments of the present invention may be used with various in-floor fittings, such as afterset fittings, preset fittings, poke-thru fittings, and the like.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. An in-floor fitting for providing access to an underfloor electric distribution system, comprising:
  a cover configured to move between open and closed positions, said cover being moved to an open position to allow a cable to pass therethrough,
  an intumescent insert positioned below said cover; and
  a receptacle positioned below said cover and configured to operatively connect to a cable comprising at least one of an electrical cable and a communication cable, wherein said cover is substantially flush with a surface of a floor when the cable is operatively connected to said receptacle and said cover is in said closed position and said cover allows the cable to extend from said receptacle and through said cover when said cover is in the closed position.

2. The in-floor fitting of claim 1, wherein said intumescent insert receives said receptacle and is positioned with respect to said cover to define a passage therebetween for receiving said cable.

3. The in-floor fitting of claim 1, further comprising a top plate, said top plate comprising at least one interior passage for receiving said receptacle and support legs extending toward said cover to define a channel therebetween for receiving said cable.

4. The in-floor fitting of claim 1, further comprising a top plate and wherein said cover is defined by a ring, said receptacle being received in said top plate and said top plate including legs extending between said top plate and said ring to define a passage, said cable extending from said receptacle through said passage and said cover in said closed position.

5. The in-floor fitting of claim 1, wherein said cover is defined by a trim ring connected to at least one access door, said access door being configured to move relative to said trim ring between said open and closed positions.

6. The in-floor fitting of claim 1, wherein said cover is defined by at least one access door including an egress door configured to open an egress door opening, wherein when said access door is in said closed position and said egress door is open, said cable extends through said egress door opening.

7. The in-floor fitting of claim 1, wherein a plug of an audio/video (AV) device is operatively connected to said receptacle and is positioned between said cover and said receptacle, and wherein said closed cover is configured to be substantially flush with said surface when said AV device is operatively connected to said receptacle.

8. The in-floor fitting of claim 1, wherein said cover is defined by at least one access door and a ring, said access door having an opening and being connected to said ring such that said access door can move from between an open and closed position, said cable being connected to said receptacle when said access door is in said open position, said access door being moved to said closed position such that said cable is received in said opening and said access door is substantially flush with said ring.

9. An in-floor fitting, comprising:
  an intumescent insert having at least one interior opening;
  a top plate having a top surface, said top plate being mounted over said intumescent insert, said top plate comprising at least one interior passage and support legs extending upwardly from said top surface;
  a trim ring having an upper surface, said trim ring being mounted to distal ends of said support legs;
  at least one access door movably secured to said trim ring, said at least one access door being movable to an open position and a closed position, wherein said at least one access door is configured to be substantially flush with said upper surface of said trim ring when said access door is in a closed position, said at least one access door comprising an egress door configured to open and close relative to said at least one access door; and at least one of an electrical receptacle and a communication device, wherein a top surface of said at least one of an electrical receptacle and a communication device is substantially flush with said top surface of said top plate, and wherein at least a portion of said at least one of an electrical receptacle and a communication device is housed within said at least one interior opening of said intumescent insert.

10. The in-floor fitting of claim 9, wherein an audio/video (AV) device is operatively connected to said at least one of an electrical receptacle and a communication device and is positioned between said at least one access door and said top surface of said top plate, and wherein said at least one access door is configured to be substantially flush with a surface of a floor when said AV connector is operatively connected to said at least one of an electrical receptacle and a communication device.

11. The in-floor fitting of claim 9, wherein said top plate and said trim ring define a central passage therebetween that receives a plug connected to said at least one of an electrical receptacle and a communication device.

12. The in-floor fitting of claim 9, wherein when said egress door is in said open position and said access door is in said closed position, said access door defines an egress door opening that receives a cable therethrough while said access door remains substantially flush with said upper surface.

13. The in-floor fitting of claim 9, wherein said trim ring has two access doors that each include an ingress door opening to receive said ingress door of said other access door or receive therethrough said at lease one of an electrical receptacle and a communication device.

14. The in-floor fitting of claim 9, wherein said at least one access door includes at least one egress opening and when said at least one access door is in said open position, said at least one of an electrical receptacle and a communication device is operably connected to a cable, said at least one access door then being moved to said closed position such that said cable extends through said egress opening and said at least one access door is substantially flush with said upper surface.

15. The in-floor fitting of claim 9, further comprising both an electrical receptacle and a communication device, said at least one access door including at least one egress opening, each of said electrical receptacle and said communication device being operably connected to a cable, each of said cables extending through said at least one egress opening such that said at least one access door is in the closed position and is substantially flush with said top surface.

16. An in-floor fitting, comprising:
an intumescent insert;
a top plate being mounted to said intumescent insert, said top plate comprising support legs extending upwardly therefrom;
a trim ring having an upper surface, said trim ring being mounted to distal ends of said support legs;
at least one access door secured to said trim ring and being movable relative to said trim ring to an open position and a closed position, wherein said at least one access door is configured to be substantially flush with said upper surface of said trim ring when said access door is in said closed position, said at least one access door defining an opening; and
at least one receptacle, wherein at least a portion of said at least one receptacle is housed within said top plate and said intumescent insert.

17. The in-floor fitting of claim 16, wherein said intumescent insert includes at least one interior opening and said top plate includes a top surface, said at least one receptacle being housed within said interior opening of said intumescent insert and substantially flush with said top surface of said top plate.

18. The in-floor fitting of claim 16, wherein said support legs define a central passage between said trim ring and said top plate, said central passage receiving a plug head of a cable that is connected to said at least one receptacle such that said cable extends through said opening of said at least one access door when said at least one access door is in said closed position.

19. The in-floor fitting of claim 16, wherein said at least one access door includes an egress door that moves relative to said at least one access door to an open position and a closed position, wherein when said egress door is in said open position, said opening receives a cable therethrough with said at least one access door in said closed position.

20. The in-floor fitting of claim 16, wherein when said at least one access door is in said open position, said at least one receptacle is operably connected to a cable, said at least one access door then being moved to said closed position such that said cable extends through said opening and said at least one access door is substantially flush with said upper surface.

* * * * *